US009188385B2

(12) United States Patent
Armellin et al.

(10) Patent No.: US 9,188,385 B2
(45) Date of Patent: *Nov. 17, 2015

(54) CONTAINER COATING SYSTEM AND PROCESS

(75) Inventors: Alberto Armellin, Vittorio Veneto (IT); Andrea Saran, Conegliano (IT); Matteo Zoppas, Conegliano (IT)

(73) Assignee: S.I.P.A. SOCIETÀ INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 1369 days.

This patent is subject to a terminal disclaimer.

(21) Appl. No.: 12/302,272

(22) PCT Filed: May 22, 2007

(86) PCT No.: PCT/EP2007/054943
§ 371 (c)(1), (2), (4) Date: Nov. 24, 2008

(87) PCT Pub. No.: WO2007/135147
PCT Pub. Date: Nov. 29, 2007

(65) Prior Publication Data

US 2009/0176031 A1 Jul. 9, 2009

(30) Foreign Application Priority Data

May 24, 2006 (IT) ............................. RM2006A0277

(51) Int. Cl.
*C08J 7/16* (2006.01)
*C08J 7/18* (2006.01)
(Continued)

(52) U.S. Cl.
CPC ................. *F26B 3/283* (2013.01); *B05C 3/005* (2013.01); *B05C 3/09* (2013.01); *B05C 3/10* (2013.01); *F26B 15/06* (2013.01); *F26B 15/14* (2013.01)

(58) Field of Classification Search
CPC ........ B05D 1/18; B05D 3/067; B05D 3/0209; B05D 3/0263; B05D 7/227; B05C 3/005; B05C 3/09; B05C 3/10; B05C 3/025; F26B 3/02; F26B 3/283; F26B 3/30; F26B 15/02; F26B 15/04; F26B 15/06; F26B 15/08; F26B 15/085; F26B 15/10; F26B 15/105; F26B 15/12; F26B 15/14; F26B 21/005; F26B 21/006; F26B 21/06; F26B 21/022; F26B 21/10; F26B 21/12; F26B 21/02; B65G 17/005; B65G 17/007; B65G 17/12–17/16; B65G 17/20; B65G 17/38–17/44; B65G 21/16; B65G 21/18; B65G 25/02
USPC ........... 118/66, 641–643, 412, 423, 426, 429; 427/521, 542, 378, 379, 389.7
See application file for complete search history.

(56) References Cited

U.S. PATENT DOCUMENTS 1,439,284 A 12/1922 Ayres
3,802,380 A * 4/1974 Ford et al. ..................... 118/679
(Continued)

FOREIGN PATENT DOCUMENTS

DE 4214502 A1 * 11/1993 ............. F26B 15/12
EP 1 367 348 A 12/1922
(Continued)

OTHER PUBLICATIONS

Webster's Nine New Collegiate Dictionary; Miriam-Webster's Inc.; Springfield, Massachusetts, USA; 1990 (no month), excerpt p. 1007.*
(Continued)

*Primary Examiner* — Marianne L Padgett
(74) *Attorney, Agent, or Firm* — Knobbe, Martens, Olson & Bear, LLP

(57) ABSTRACT

A coating system (1) for blown containers (9) made of plastic material, with high production rate and flexibility so as to allow an efficient coupling with the most advanced one-stage or blowing machines. Such coating system (1), despite its high production rate, envisages a compact global structure with low implementation costs and contained energy consumption. Along with the system, a corresponding coating process is described, which consists in the effective and rapid application of several paint layers on plastic containers (9).

15 Claims, 10 Drawing Sheets

(51) Int. Cl.

| | |
|---|---|
| ***B05D 3/06*** | (2006.01) |
| ***B05D 3/02*** | (2006.01) |
| ***B05C 13/02*** | (2006.01) |
| ***F26B 3/28*** | (2006.01) |
| ***B05C 3/00*** | (2006.01) |
| ***B05C 3/10*** | (2006.01) |
| ***B05C 3/09*** | (2006.01) |
| ***F26B 15/06*** | (2006.01) |
| ***F26B 15/14*** | (2006.01) |

(56) References Cited

U.S. PATENT DOCUMENTS

| | | | | | |
|---|---|---|---|---|---|
| 4,009,301 | A | * | 2/1977 | Heckman et al. | 427/195 |
| 4,009,776 | A | * | 3/1977 | Skrypek et al. | 198/471.1 |
| RE29,590 | E | * | 3/1978 | Whelan | 250/493 |
| 4,092,953 | A | * | 6/1978 | Waugh | 118/642 |
| 4,525,377 | A | * | 6/1985 | Nickel et al. | 427/532 |
| 4,538,542 | A | * | 9/1985 | Kennon et al. | 118/302 |
| 4,620,985 | A | * | 11/1986 | Goodburn et al. | 427/510 |
| 4,730,575 | A | * | 3/1988 | Jenkins | 118/47 |
| 4,996,779 | A | | 3/1991 | Nakagomi et al. | |
| 5,209,181 | A | * | 5/1993 | Flood | 118/322 |
| 5,254,164 | A | * | 10/1993 | Masahumi | 118/58 |
| 5,385,611 | A | * | 1/1995 | Matsumoto et al. | 118/642 |
| 5,513,445 | A | | 5/1996 | Farrag et al. | |
| 5,543,186 | A | | 8/1996 | Andersen et al. | |
| 5,658,619 | A | | 8/1997 | Kirschner et al. | |
| 5,714,217 | A | | 2/1998 | Andersen et al. | |
| 7,025,193 | B2 | * | 4/2006 | Zoppas et al. | 198/377.03 |
| 7,435,076 | B2 | * | 10/2008 | Zoppas et al. | 425/526 |
| 7,560,137 | B2 | * | 7/2009 | Zoppas et al. | 427/240 |
| 7,926,197 | B2 | * | 4/2011 | Zoppas et al. | 34/90 |
| 8,221,851 | B2 | * | 7/2012 | Zoppas et al. | 427/557 |
| 8,858,216 | B2 | * | 10/2014 | Zoppas et al. | 425/533 |
| 2004/0071885 | A1 | * | 4/2004 | Hutchinson et al. | 427/385.5 |
| 2004/0071891 | A1 | * | 4/2004 | Luka | 427/421 |
| 2004/0173949 | A1 | | 9/2004 | Storione et al. | |
| 2006/0019037 | A1 | * | 1/2006 | Zoppas et al. | 427/430.1 |
| 2006/0040063 | A1 | | 2/2006 | Zoppas et al. | |
| 2006/0127616 | A1 | * | 6/2006 | Beck | 428/35.7 |
| 2006/0177575 | A1 | | 8/2006 | Takemoto et al. | |
| 2006/0233956 | A1 | * | 10/2006 | Hagman et al. | 427/299 |
| 2009/0104387 | A1 | * | 4/2009 | Postupack et al. | 428/34.6 |
| 2010/0132211 | A1 | * | 6/2010 | Pittari et al. | 34/265 |
| 2010/0209290 | A1 | | 8/2010 | Cirri et al. | |
| 2011/0262658 | A1 | * | 10/2011 | Zoppas et al. | 427/557 |

FOREIGN PATENT DOCUMENTS

| | | | |
|---|---|---|---|
| GB | 936 147 | A | 9/1963 |
| JP | 63231908 | | 9/1988 |
| WO | 0056510 | A | 9/2000 |
| WO | WO 01/49075 | A | 7/2001 |
| WO | WO 03/072265 | | 9/2003 |
| WO | WO 2004/024346 | A2 | 3/2004 |
| WO | 2007017484 | A1 | 2/2007 |

OTHER PUBLICATIONS

Machine translation of DE 4214502 A1, by Richard Buchmann.*

* cited by examiner

CONTAINER COATING SYSTEM AND PROCESS

CROSS REFERENCE TO RELATED APPLICATIONS

This application claims the benefit and priority to and is a U.S. National Phase of PCT International Application Number PCT/EP2007/054943, filed on May 22, 2007. This application claims the benefit and priority to Italian Application No. RM2006A000277 filed on May 24, 2006. The disclosures of the above-referenced applications are hereby expressly incorporated by reference in their entirety.

FIELD OF THE INVENTION

The present invention relates to a coating system and corresponding process for containers made of plastic material, such as PET bottles, made by blow moulding.

STATE OF THE ART

One-stage or blowing machines are currently used for the production of food-grade containers in plastic materials of various shapes, such as for example bottles and pots made of PET, PP, HDPE, PEN, etc.

A one-stage machine for the production of containers, such as bottles, pots, etc., is a system which, through an injection and subsequent stretching and blowing sequence, goes from transforming raw plastic material granules to producing a blown container in its final shape all in one machine.

A blowing machine is, instead, an apparatus which, through a process of heating and subsequent stretching and blowing, transforms preforms, obtained separately by means of an injection machine, into blown containers. This is known as a two-stage machine.

In some cases, when a particular performance is required for such containers, for example in relation to the particular type of liquid that they must contain, the blowing step is followed by a coating operation. Products particularly suitable for making the container impermeable to gas, such as oxygen and/or carbon dioxide, are employed for this application. The problem of gas permeability of the container walls is particularly felt, for example, for bottles intended to contain carbonated beverages, but also for other food products and beverages in which oxidation causes a decay of the organoleptic properties of the products thus reducing its shelf-life. In other cases, the coating is performed simply in order to decorate the outside of the containers.

Coating is the application of an external protection consisting of one or more paint layers to a container, which increases the oxygen and/or carbon dioxide barrier properties thereof without altering, or even improving, the other mechanical and strength properties of the non-treated container.

A coating system is, instead, an industrial production line adapted to perform a coating process with a specific continuity and frequency on containers of predetermined features coming either directly from an output section of the one-stage or blowing machines or from storage areas, e.g. silos.

The known coating systems may have a size varying widely according also to the required production rate of the systems, which today varies in the range from hundreds to tens of thousands of bottles per hour.

Such systems are therefore highly automated and are generally controlled by dedicated computers or general application computers which, in particular cases, may also be personal computers running specifically developed software.

The common structure of these systems comprises at least one loading station of the containers to be coated, a coating station, a coating reticulation station, comprising for example ovens of various types depending on the paint employed, and also an unloading or transfer station of the coated containers to other machines. In such systems, the containers are conveyed along the various stations forming the system by means of chains provided with gripping devices, in particular the so-called preform holders, or conveyor belts on which the containers rest.

Given the increasing diffusion of plastic containers on certain markets, one-stage or blowing machines with increasingly high production rates are made today, but the existing coating systems do not efficiently allow continuous operation of an elaborate process, such as the coating process, which envisages coating, drying and reticulating the paint at such high production rates. Indeed, coatings or paints increasingly effective for extending the shelf-life of products in containers have been developed, but such paints require more complex and more numerous operations than in the past to complete the coating process. In order to perform such operations, a high consumption of energy and considerable time is required to the detriment of production speed in such systems, this speed further decreasing if more than one paint layer is applied and reticulated. Furthermore, it is desirable to have the opportunity to feed a coating system directly with containers from a one-stage or blowing machine because of the advantages that this entails, including a better level of cleanliness of the containers themselves, with consequent better paint adhesion and lower risk of defects. On the other hand, the better paint adhesion causes a more uniform distribution and, therefore, reticulation of the same, with consequent improved quality of the general performance of the paint (barrier effect, chemical resistance, mechanical strength, aesthetic qualities, etc.). In this way, the number of wastes would also be reduced. Disadvantageously, the existing coating systems, in particular those capable of higher production rates, also envisage high energy consumption, which causes a distinctively unfavourable energy balance, and exhibit a very large structure with processing stations occupying large surfaces, therefore also determining high construction costs. The need is therefore felt to obtain a coating system and corresponding process capable of overcoming the aforesaid drawback.

SUMMARY OF THE INVENTION

The primary object of the present invention is to obtain a coating system for blown plastic material containers, which, thanks in particular to the paint coating drying and reticulating oven configuration, is capable of considerably improving the energy balance while ensuring production rates and flexibility so as to allow efficient coupling to the most advanced one-stage machines or to blowing machines.

Another object of the invention is to obtain a coating system which, despite the high production rate, has a compact global structure and low implementation costs.

A further object of the invention is to make a coating process which allows an effective and rapid application of several paint layers on plastic containers.

The present invention, therefore, intends to reach the above discussed objects by means of a coating system for blown plastic material containers and a corresponding coating process. The system of the invention comprises a first oven and a second drying-reticulating oven of a first and second paint layer respectively, said first and second oven having a modular structure comprising one or more thermal treatment tunnels.

The production rate of the system of the invention may vary in the range of approximately 6000 to 42000 bottles/hour and may even be higher. Advantageously, thanks to its innovative features, the system according to the invention may be configured so as to be adapted to the various production needs, and may be configured in increasing steps, for example from 6000 bottles to 42000 bottles per hour.

The number of thermal treatment tunnels can also be increased without needing to redesign the system or without major structural interventions, maintaining the surface occupied by the system virtually unaltered. Such modular system facilitates system range expansion, allowing to increase or decrease the production rate.

Advantageously, the reticulation and drying ovens for the paint layers applied to the containers envisage two levels, each level comprising two banks, with the result of a considerable space saving.

In order to reduce energy consumption, energy recovery of infrared radiation, used in some portions of the ovens, not absorbed by the container/coating system, is advantageously envisaged. This recovery is performed by means of air/water heat exchangers appropriately arranged near the banks on which the containers pass. This energy recovery may also concern UV radiation not absorbed by the containers.

A further advantage is represented by the possibility of adjusting the air temperature within the ovens by operating on the feeding temperature of the water to the air/water heat exchangers.

Mixing systems, independent for the infrared area and the hot air area, are envisaged to mix at least part of the exhausted hot air flow from the ovens with the air taken from the outside before it is conveyed back into the oven.

Furthermore, the presence of at least one fan impeller, arranged in a central area of the ovens or of the single thermal treatment tunnels, allows a uniform distribution of the air to the oven compartments or sectors, by exploiting the symmetries and the different configurations envisaged by the internal structure of the ovens themselves.

The dependent claims describe preferred embodiments of the invention.

BRIEF DESCRIPTION OF THE FIGURES

Further features and advantages of the invention will be more apparent in light of the detailed description of a preferred, but not exclusive, embodiment, of a coating system illustrated by way of non-limitative example, with the aid of the accompanying drawings, in which.

DETAILED DESCRIPTION OF A PREFERRED EMBODIMENT OF THE INVENTION

Figure 1:
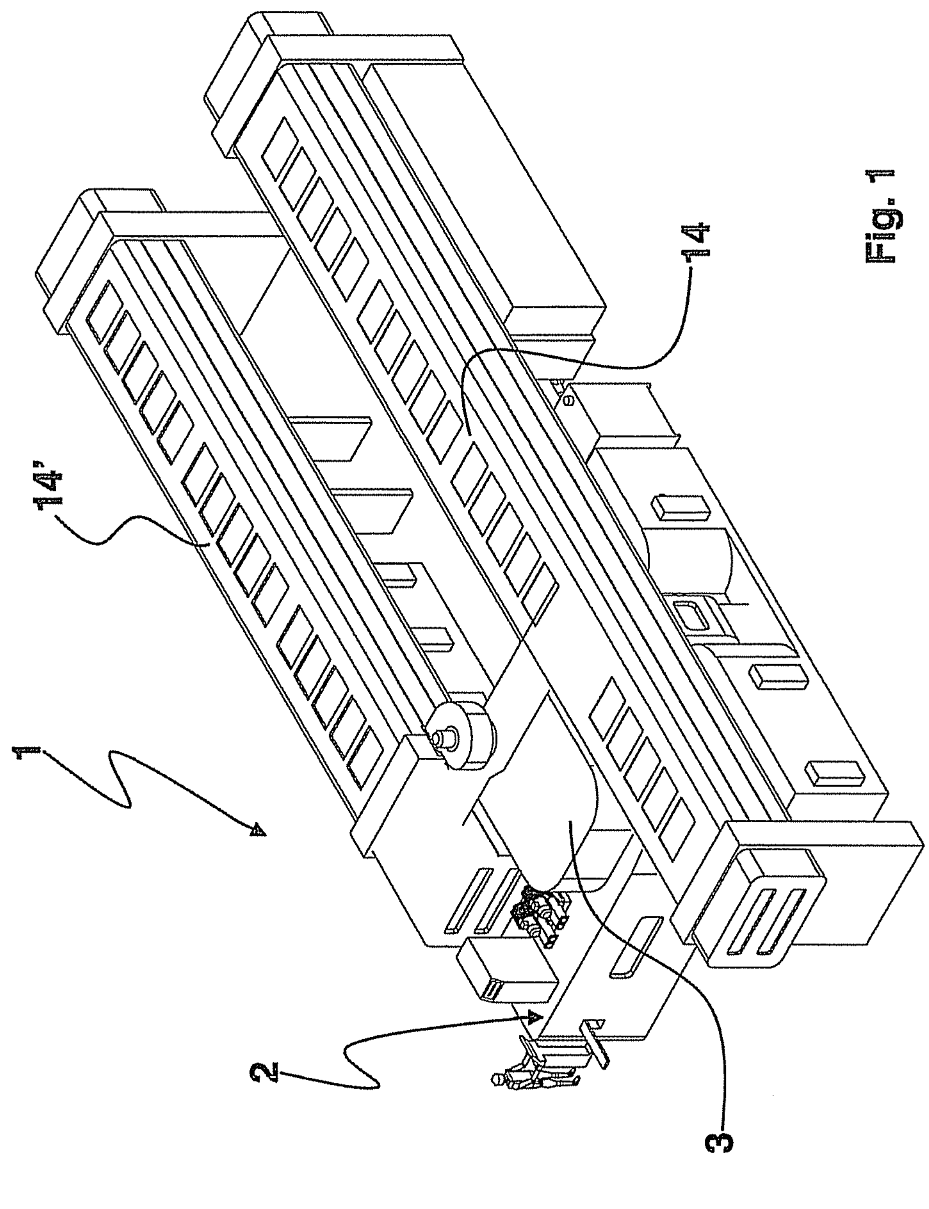
FIG. 1 is a perspective view of the coating system according to the invention.
Figure 2:
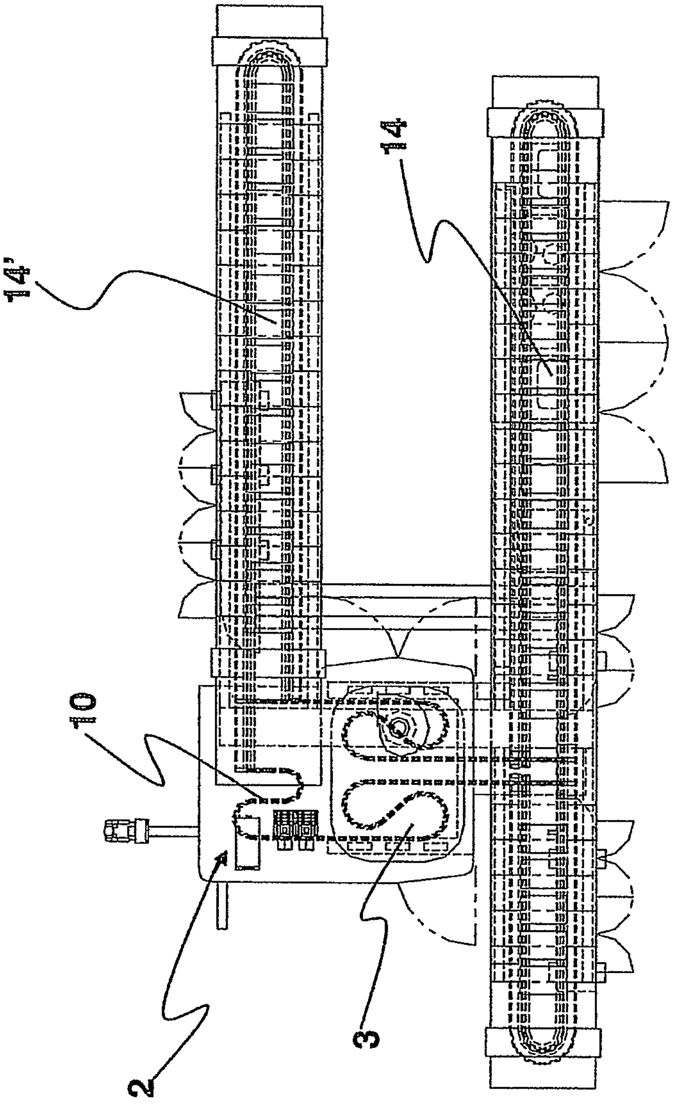
FIG. 2 is a plan view of the system in FIG. 1.

With reference to the figures, there is shown a preferred embodiment of a coating system according to the present invention, in particular a system envisaging the application of a two-layer paint coating on containers or bottles made of plastic material, for example PET, PP, HDPE, etc.

The first layer to be applied, named base coating, is generally a type of coating having $O_2$ and/or $CO_2$ barrier properties, simply named barrier coating. The second layer, named top coating, is generally a type of protective paint. The number of coats applied to the containers may be equal to one or greater than two.

The coating system according to the invention, shown as a whole by reference 1, comprises:

- a loading/unloading station 2 used to load containers onto a single transfer chain 10 of the coating system and to unload containers from said chain 10 once the coating process is completed;
- an optional surface treatment station (not shown) having an activation system of the container surface;
- a coating station 3 for the application of the barrier and top paint coats;
- a base coat drying-reticulating station or oven 14;
- a top coat flowing-reticulating station or oven 14'.

The loading/unloading station 2 comprises a loading drum capable of:

- taking the containers coming from a conveyor line of predetermined features, such as an air, belt or slat conveyor, either directly from a one-stage or blowing machine, or alternatively from a silos or storage area,
- sorting them in vertical position and distancing them at a defined pitch,
- securing them mechanically by the neck without damaging them and conveying them onto the single transfer chain 10 arranged in a closed circuit which passes through the entire coating system 1.

Preferably, the containers are held in vertical position with respect to the single transfer chain 10 by means of a series of fastening supports or grips, for example preform holders, uniformly spaced out along the chain itself. Advantageously, the loading drum is such that:

- it allows the ejection of containers 9 if loading problems arise;
- it performs shape monitoring to prevent containers not complying to dimensional specifications from being loaded onto the transfer chain and sent to the coating station;
- it is easily and rapidly customisable according to the container neck type. An estimated change-over time of 1 hour is envisaged for a neck change.

The optional surface treatment or pre-treatment station immediately downstream of the loading drum envisages an activation system of the container surface by means of methods such as crown effect, plasma, UV, skin-drying, for increasing the container wettability before applying paint and therefore obtaining a better result. In particular, PP containers must be activated by passing through a ionised environment created by a series of customised electrodes (crown effect).

The estimated treatment time is approximately 4 s, or less in the case of a plasma effect surface activation system.

If the containers come from storage areas, these may be subjected in this same station to a deionised air blowing operation to remove possible electrostatic charges, dusts, etc. which are deposited on the external surface of the containers. When required by the process, the subsequent step consists in subjecting the containers to an electrical charge in an electrical field, for example of approximately 10-15 kV, to charge the containers with an appropriate electrical current before sending them to the following step in the coating station.

The coating station 3 for the application of the barrier or top coating layers, shown in figures from 3 to 5*b*, comprises an application machine or roundabout 4. Such application roundabout 4 is a rotary machine which receives containers 9 and in turn comprises:

- a first immersion wheel 5 and a first spinning wheel 6 for applying barrier or base paint and for adjusting the thickness of the base coat, respectively,
- and a second immersion wheel 7 and a second spinning wheel 8 for applying top paint and for adjusting the thickness of the top coat, respectively.

Figure 3:
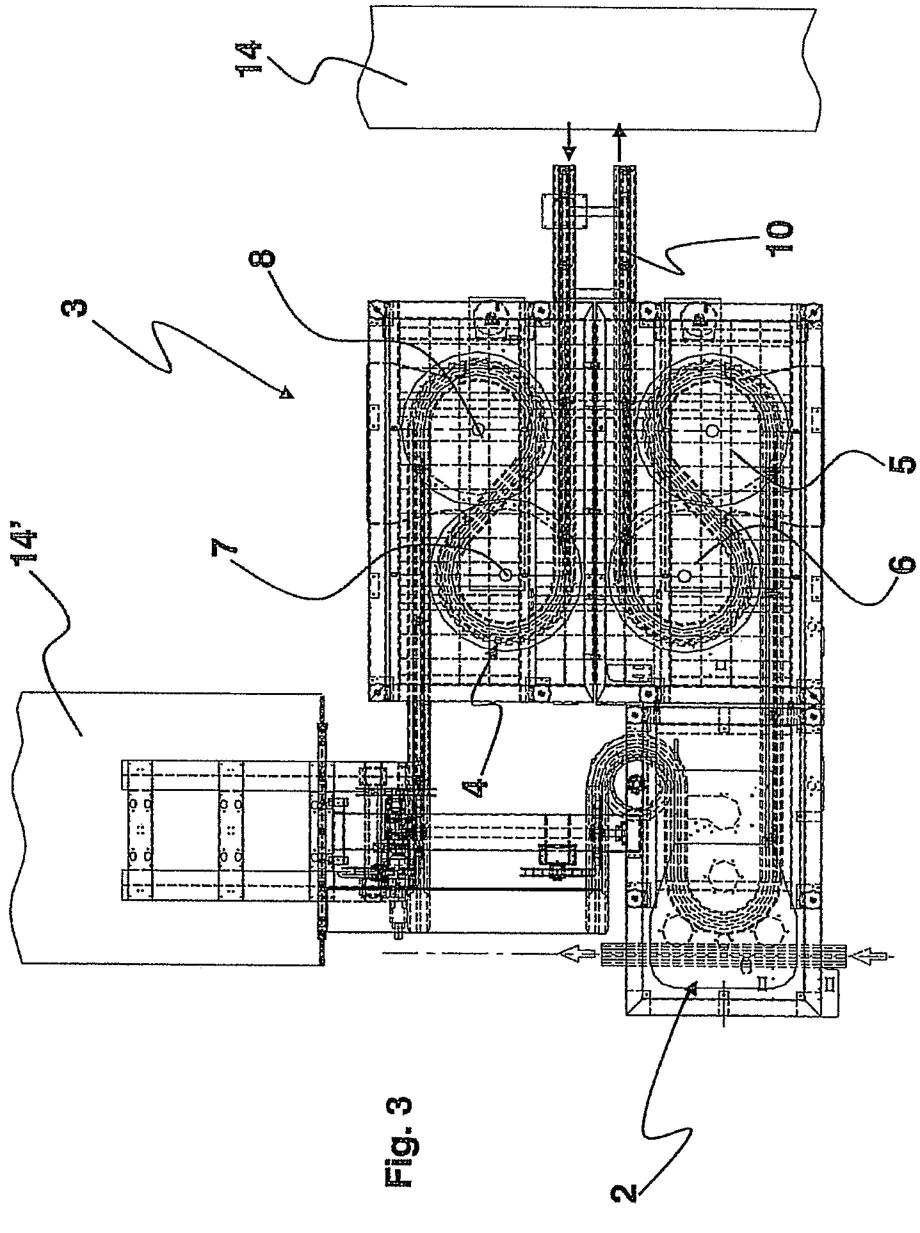
FIG. 3 is a plan view of a first processing station of the system in FIG. 1.
Figure 4:
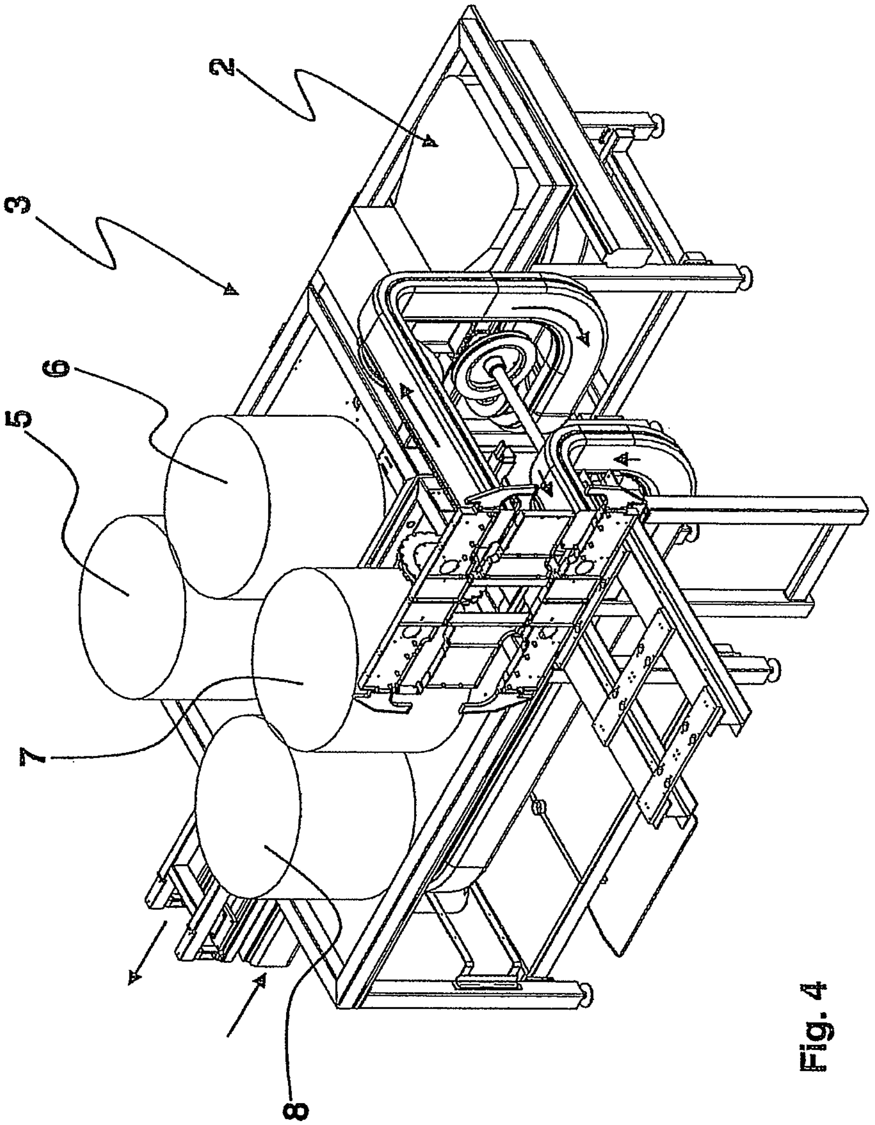
FIG. 4 is a perspective view of the first station in FIG. 3.

Underneath the first and second immersion wheels or drums 5, 7, around which said transfer chain 10 is wound to change the direction of motion as shown in FIG. 3, a plurality of tanks 11 containing respectively a type of paint, e.g. barrier or top paint, are envisaged. Such tanks 11 turn in synchrony with the rotation movement of the respective wheel or drum and during such rotation each tank is adapted to vertically shift in order to accommodate the corresponding container 9 which is thus immersed into the paint.

Figure 5B:
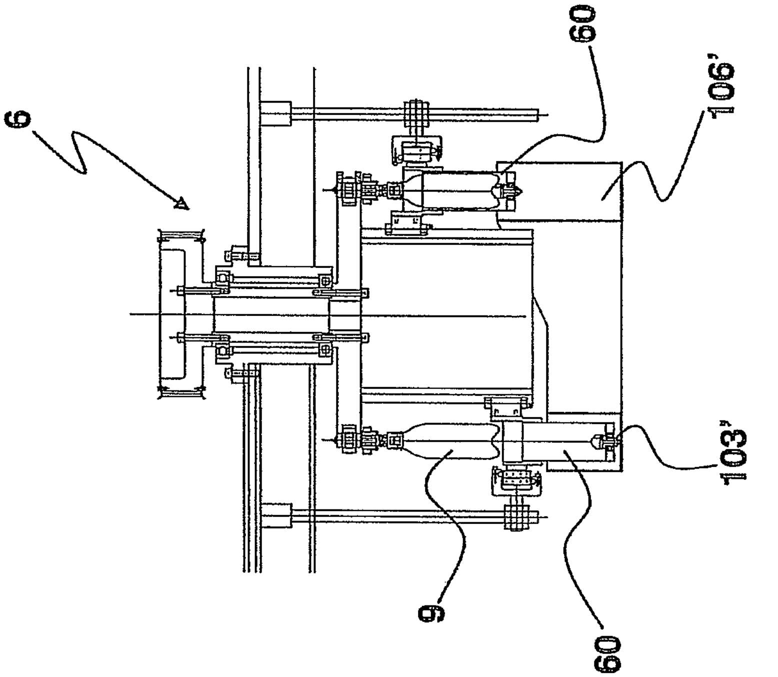
FIG. 5*b* is a schematic sectional view of a second part of said first station.
Figure 5A:
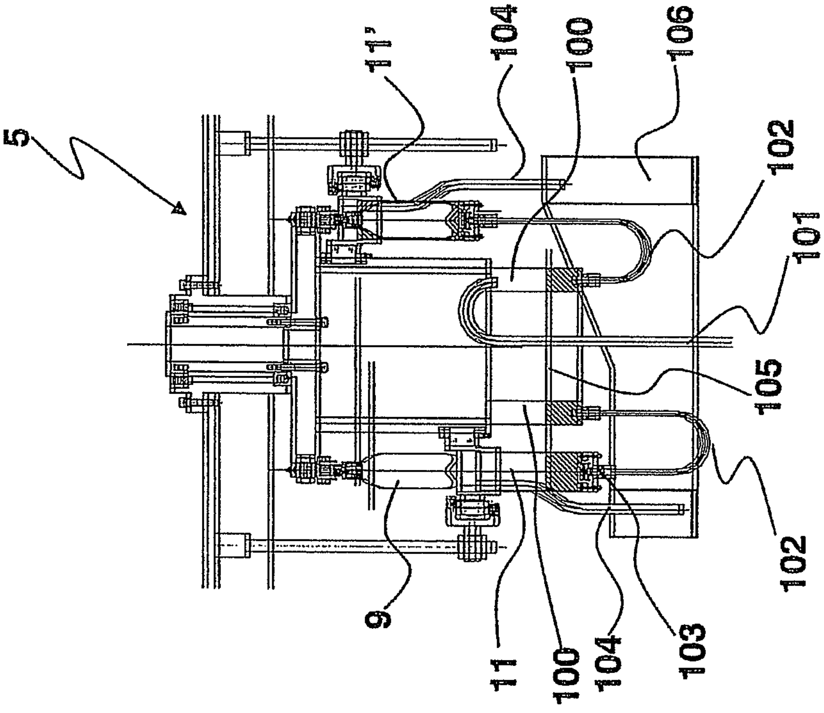
FIG. 5*a* is a schematic sectional view of a first part of said first station.

With reference to FIG. 3, chain 10, carrying grips each of which holds the neck of a container, is wound around first immersion wheel 5, underneath which there is placed a first plurality of tanks 11, visible in FIG. 5*a*, turning in synchrony with said first wheel 5 and containing the base or barrier paint. The base layer is applied by a process of immersion of the containers in said first plurality of tanks. Such tanks are actually arranged and move so as to each receive one container at a time. Tanks capable of immerging several containers at a time may also be envisaged. During the operation of the system according to the invention there is a time sequence which envisages the positioning of a container 9 over a tank 11; the synchronous shift of said container and of said tank while the latter is raised to a higher position in which the container is immersed in the paint contained in the tank to receive a first coat of base or barrier paint; and the lowering of the tank to extract the container from the paint.

The application roundabout 4 performs the following functions:

- it rigidly secures the container holding it by its neck thus at the same time preventing dust and liquids from entering;
- it allows the relative movement between container and tank controlled, for example, by a cam system.

The total immersion stroke depends on the adopted mechanical configuration and is subdivided into two parts: a first approach stroke of the fluid front in tank 11 to container 9 in which the average raising speed must be the maximum speed compatible with the reliability of the mechanical system; and a second stroke in which the immersion process, in which the average speed of immersion and emersion must be no more than 300 mm/sec, is performed. The immersion stroke depends on the geometric configuration of the tank in which immersion occurs. The cam system must maintain the container in immersed position for approximately 0.2 second.

In a first variant (not shown), the coating is supplied to the tanks by means of a delivery pump or of a plurality of delivery pumps if the dimensions of the system so require, and a revolving joint.

The delivery pump continuously supplies coating to tanks 11 by means of the revolving joint through a first chamber in the joint which envisages attachments for the flexible delivery tubes communicating with the tanks. The revolving joint is also provided with a second chamber, separate from the first, which instead envisages attachments for the flexible return tubes, the latter also communicating with the tanks, for evacuating the excess paint using a suction pump. The rotating joint is connected with its lower end by means of respective delivery and return tubes of the coating to a collection tank, arranged in an intermediate position between the revolving joints themselves and a central tank of the base coating (not shown).

In a second variant, shown in FIG. 5*a*, the paint may be fed to the tanks 11 by means of a toroidal tank 100, into which paint is fed by tube 101. In a first variant, toroidal tank 100 and tank 11 are connected by means of a tube 102 as communicating vessels, so that the paint reaches, in tanks 11 and 100, level 105. During rotation of wheel 5, tank 11 is raised to position 11', so that container 9 is immersed in the paint; a valve 103 prevents the paint from flowing from the bottom of tank 11, if the communicating vessel principle is used, while an overflow valve 104 channels the paint which possibly overflows from tank 11 towards a collection tank 106 to a high position shown on the right in FIG. 5*a*.

The two communicating vessel feeding systems and a pump with revolving joint may also be appropriately used in combination, if this is advantageous.

Progressively, as the containers leave the first immersion wheel 5, chain 10 starts winding about the first spinning wheel 6 to adjust the thickness of the base coat of barrier paint. In this wheel 6, each container, during its advancement, is turned about its axis for a certain period of time within a respective cell or protective shield 60 (FIG. 5*b*) which is positioned around it.

Such cell advantageously has a system for the total recovery of excess paint eliminated by the spinner itself. Such system comprises either a revolving joint whose lower end is connected by means of paint return tubes to the collection tank or, as shown in FIG. 5*b*, envisages valves 103' arranged on the bottom of protective cells 60 to discharge the excess paint eliminated into a collection tank 106'.

The rotation speed of the containers during the spinning step is adjustable in the range from 200 to 3000 revolutions per minute and is independent from the rotation speed of roundabout 4. The spinning time is approximately 1 second.

The applied wet barrier paint film has a thickness which may vary from 100 to 20 microns with a tolerance of 5 microns; the thickness of the wet film must be maintained within the required tolerances on the entire surface of the container and for the entire duration of operation of the machine.

Having applied the first paint layer on the containers by immersion and having the containers been spun in order to eliminate the excess paint itself, the transfer chain 10 conveys the containers to a base coat drying-reticulation oven 14, simply named base oven 14. The aim of base oven 14 is to remove a solvent, generally water, from the barrier paint and to fully polymerise the latter. The maximum temperature allowed for the coated surface of the container is 65±2° C.; the maximum temperature allowed for the non-coated parts, i.e. neck and neck ring, is 55±2° C.

Figure 6:
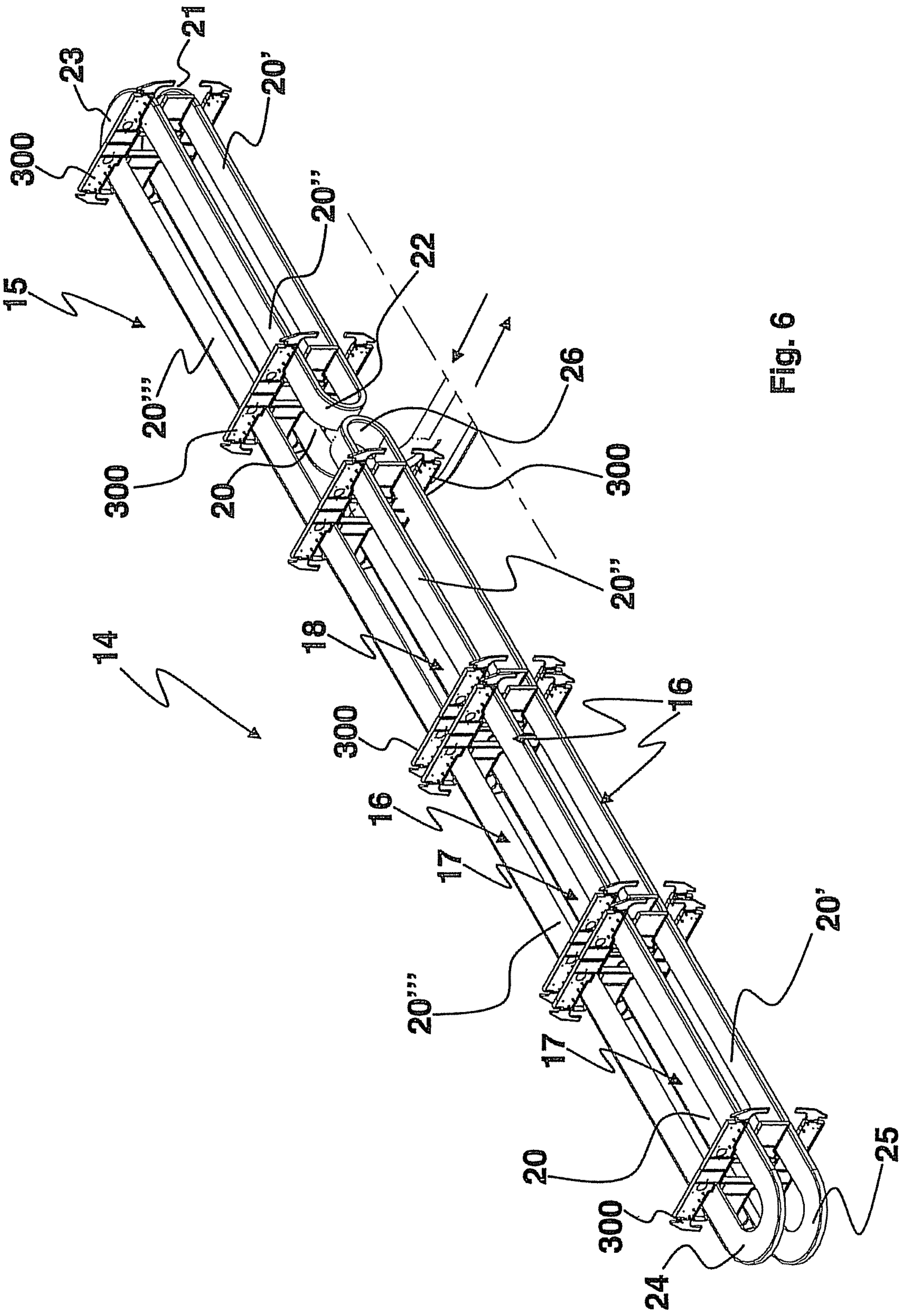
FIG. 6 is a schematic view of the course of the containers within the first oven of the system according to the invention.
Figure 7:
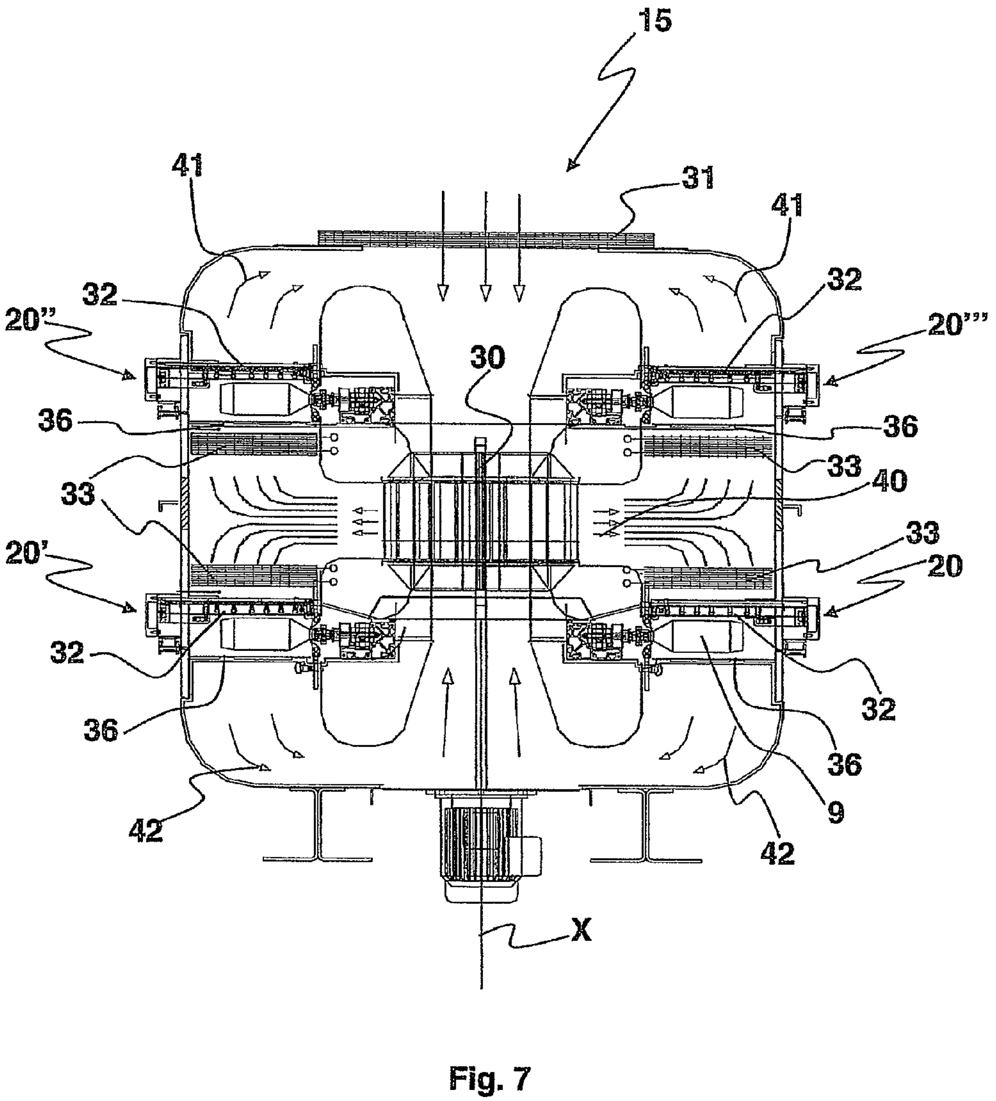
FIG. 7 is a first cross section of the first oven in FIG. 6.

Before introduction into the base oven 14, the direction of motion of transfer chain 10 is deviated first vertically and then again horizontally so that the grips or preform holders are turned in order to place the containers with their longitudinal axis in horizontal position, as shown for example in FIG. 7. A first torsion of chain 10 is then induced. Containers 9 pass through base oven 14 in horizontal position remaining anchored to transfer chain 10 which follows a two-level course, schematically shown in FIG. 6, comprising four banks, two lower and two higher, joined together by curved segments or simply by curves.

The drying step, whose purpose is to remove the solvent, generally water, from the barrier paint is based on the combined use of infrared radiation (IR) and air convection. The containers are subjected to drying for the time required for the solvent to evaporate sufficiently for an optimal completion of the subsequent process steps, for example to prevent the formation of bubbles during the subsequent reticulation step. Furthermore, the paint itself could require a certain time to flow evenly on the surface of the container.

The part of the base oven 14 dedicated to drying is subdivided into two main areas:

an infrared radiation area or IR area;

and a hot air area.

The chain firstly passes through the IR area of the base oven 14, indicated as a whole by reference 15, a cross-section of which is shown in FIG. 7. A container 9 in horizontal position, covered by a coat of barrier paint, enters IR area 15 and, considering the surface of the sheet in FIG. 7, passes through lower right bank 20 in the direction of the observer. Following curve 21 (FIG. 6), container 9 returns to area 15 and passes through lower left bank 20' thus moving away from the observer. Following curve 22, the container then passes into the upper left bank 20" advancing again towards the observer; finally, by means of curve 23, it passes to the upper right bank 20'", moving away from the observer and going towards the outlet of IR area 15.

In the preferred embodiment, IR area 15 is provided with:

at least one air suction filter 31 arranged on the upper wall of the base oven, said air coming from the outside of the oven at a temperature from 15 to 35° C.;

at least one fan with one impeller 30, arranged essentially in the middle of the IR area 15 between the upper and lower banks;

a plurality of IR modules in each of the banks, preferably but not necessarily five modules for each bank.

The IR modules, delimited on the top and on the bottom by a perforated metallic sheet 36, for example aluminium, each comprise a battery of IR lamps 32, e.g. quartz lamps at a temperature of 1800° K of the low thermal inertia type, known as ‘medium wave IR’ lamps, or advantageously lamps known as ‘short wave’ lamps with a temperature of 2400° K.

Within the oven, the air is aspirated through filter 31 longitudinally along axis X of impeller 30 and then ejected by the same impeller at a 90° angle with respect to said axis. The side flows of air 40 thus generated are split, by impacting against the side walls of the base oven, into first upward flows 41 and second downward flows 42 through the IR modules of upper banks 20", 20'" and lower banks 20', 20, respectively. In this way, the air flow within IR area 15 is advantageously optimised: the presence of fan impeller 30, arranged in the central area of the IR area, indeed allows a uniform distribution of the air to the four compartments of the oven by exploiting the symmetries of the structure.

Before reaching the containers, air flows 41, 42 respectively pass through a heat exchanger, such as for example an air-water finned heat exchanger or radiator 33, having the function of energy recovery of the radiative heat not absorbed by the container/coating system, thus advantageously implementing a heat regulating action of the air in the oven itself.

At the outlet of IR area 15, container 9 remains on the upper right bank 20'" and enters hot air area 16, where the heat of previous radiators 33 is conveyed at a predetermined temperature and speed. In this embodiment, hot air area 16 extends on banks 20'", 20" and 20' connected by curves 24, 25 and 26, each of said banks being subdivided into modules, for example into fifteen modules.

Figure 8:
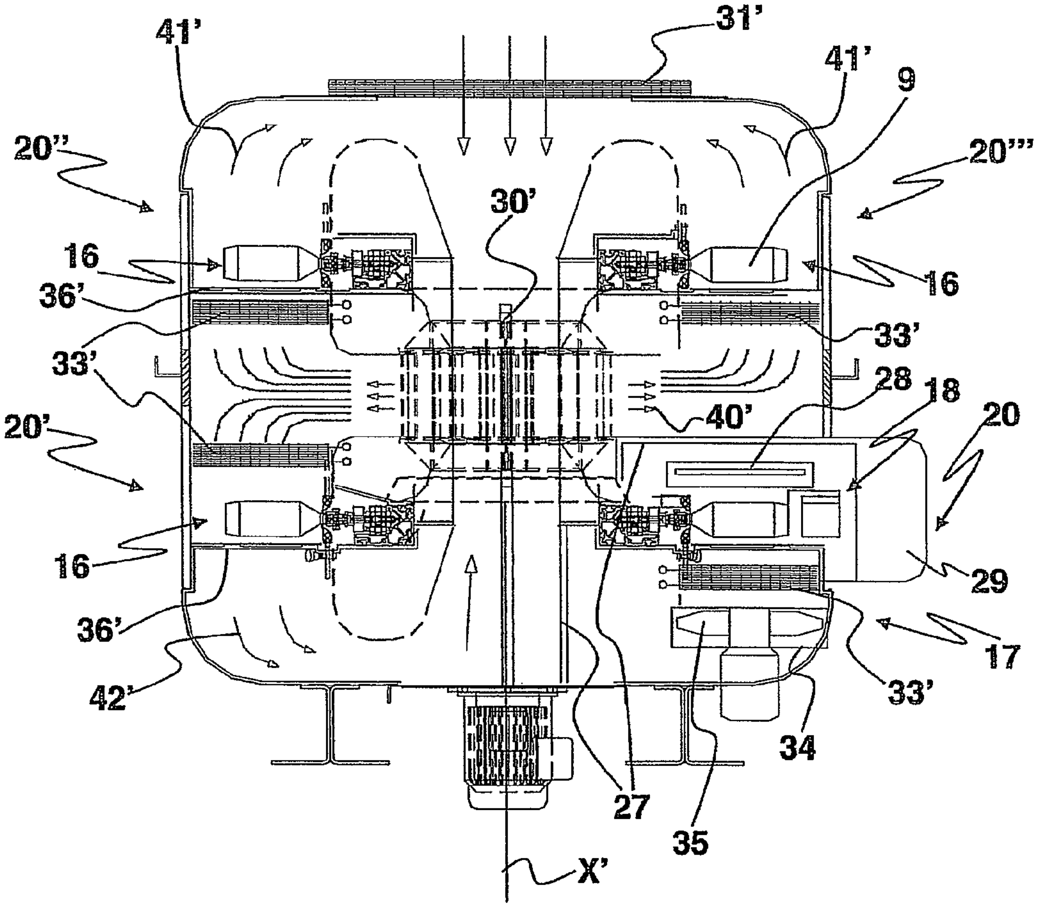
FIG. 8 is a second cross section of the first oven in FIG. 6.

A cross-section of the part of base oven 14 comprising the hot air area 16 is shown in FIG. 8. In this case, the hot air, aspirated by at least one filter 31' is ejected by at least one impeller 30' generating side flows of air 40', forming on the right side only one upward flow 41' because the lower right bank 20 is isolated from the other banks by means of partition walls 27. On the left side, instead, an upward flow 41' and a downward flow 42' are generated. Also in hot air area 16, air-water finned packs or radiators 33' and perforated metallic plates 36' are provided on the banks.

The drying step times, at nominal rate, are advantageously subdivided as follows:

in IR area 15 a net minimum time of the curves equal to 10-20 seconds, preferably 16 sec;

in hot air area 16 a net minimum time of the curves equal to 30-50 seconds, preferably 40 sec.

The thermal features of the drying step are:

in IR area 15: specific power equal to 50-80 kW/m$^2$ (preferably 60 kW/m$^2$); ventilation of approximately 2 m/sec on free area with air at variable temperature from 50 to 70° C.; power distribution on four levels, high, medium-high, medium-low, low;

in hot air area 16: ventilation of approximately 2 m/sec on free area and air at calibratable temperature from 50 to 70±2° C.

The part of the base oven 14 dedicated to the barrier paint reticulation is also subdivided into two main areas:

a cold air conditioning area 17 where container 9 exiting hot air area 16 is cooled: the temperature of the container surface must be reduced from approximately 65° C. to a temperature lower than 40° C.;

and an ultraviolet area or UV area 18 where the barrier paint is actually polymerised by means of UV radiation at a predetermined wavelength.

In the preferred embodiment, areas 17 and 18 are both envisaged on lower right bank 20, separated from the other three banks, where hot air flows, by partition walls 27. The cross-section in FIG. 8, at bank 20, respectively shows area 17, comprising a cold air pressurised channel 34 with fans 35, and UV area 18, equipped with a medium pressure mercury discharge lamp 28 and comprising an ozone discharge channel 29.

The times of the reticulation step are advantageously subdivided as follows:

in air conditioning area 17 a maximum gross time of approximately 9 seconds (+/−3 sec);

in UV area 18 a minimum gross time of approximately 5 seconds (+/−2 sec).

The thermal features of the reticulation step are:

ventilation at approximately 2 m/sec on free area with air at a maximum temperature of 40° C. in air conditioning area 17;

specific power of approximately 120 kW/m$^2$ gross, ventilation at 2 m/sec on free area with air at a maximum temperature of 40° C. in UV area 18.

Base oven 14, in the embodiment shown in FIG. 6, envisages four thermal treatment tunnels overall; one exclusively envisaged for the emission of infrared radiation and the other three for various hot air conditioning, cold air conditioning and emission of ultraviolet radiation banks. Each tunnel is provided with at least one fan with an impeller and is delimited with respect to the adjacent tunnel by panels 300.

Once the first layer of barrier paint is reticulated on the containers, transfer chain 10 takes the containers from base oven 14 back to coating station 3. At the UV area 18 outlet, chain 10 diverts its direction of motion at first vertically downwards and then again horizontally so that the preform holders are turned in order to place the containers again with their longitudinal axis in vertical position. A second torsion of chain 10 is then induced.

The containers then pass through coating station 3 in vertical position with chain 10 wound about the second immersion wheel 7, underneath which a second plurality of tanks, turning in synchrony with said second immersion wheel 7 and containing the top paint. The top coat is applied also in this case by immersing the containers into said second plurality of tanks similarly as described above for applying the base layer.

Progressively, as the containers leave the second immersion wheel 7, chain 10 starts to wind about the second spinning wheel 8 to adjust the thickness of the top layer of protective paint which occurs similarly as described for the first spinning wheel 6.

The applied wet top paint film has a thickness which may vary from 20 to 10 microns with a tolerance of 2 microns; the thickness of the wet film must be maintained within the required tolerances on the entire surface of the container and for the entire duration of operation of the machine.

Having applied the second paint layer on the containers by immersion and having the containers been spun to eliminate the excess paint itself, transfer chain 10 conveys containers 9 inside a top coating flowing-reticulation or drying-reticulation oven 14', simply named top oven 14'. The aim of the top oven 14' is to remove a low-boiling solvent, for example ethanol, from the top paint film, with consequent flow of the film itself, and obtain complete polymerisation of said top paint. The maximum temperature allowed for the coated surface of the container is 65±2° C.; the maximum temperature allowed for non-coated parts, i.e. neck and neck ring, is 55±2° C.

Figure 9:
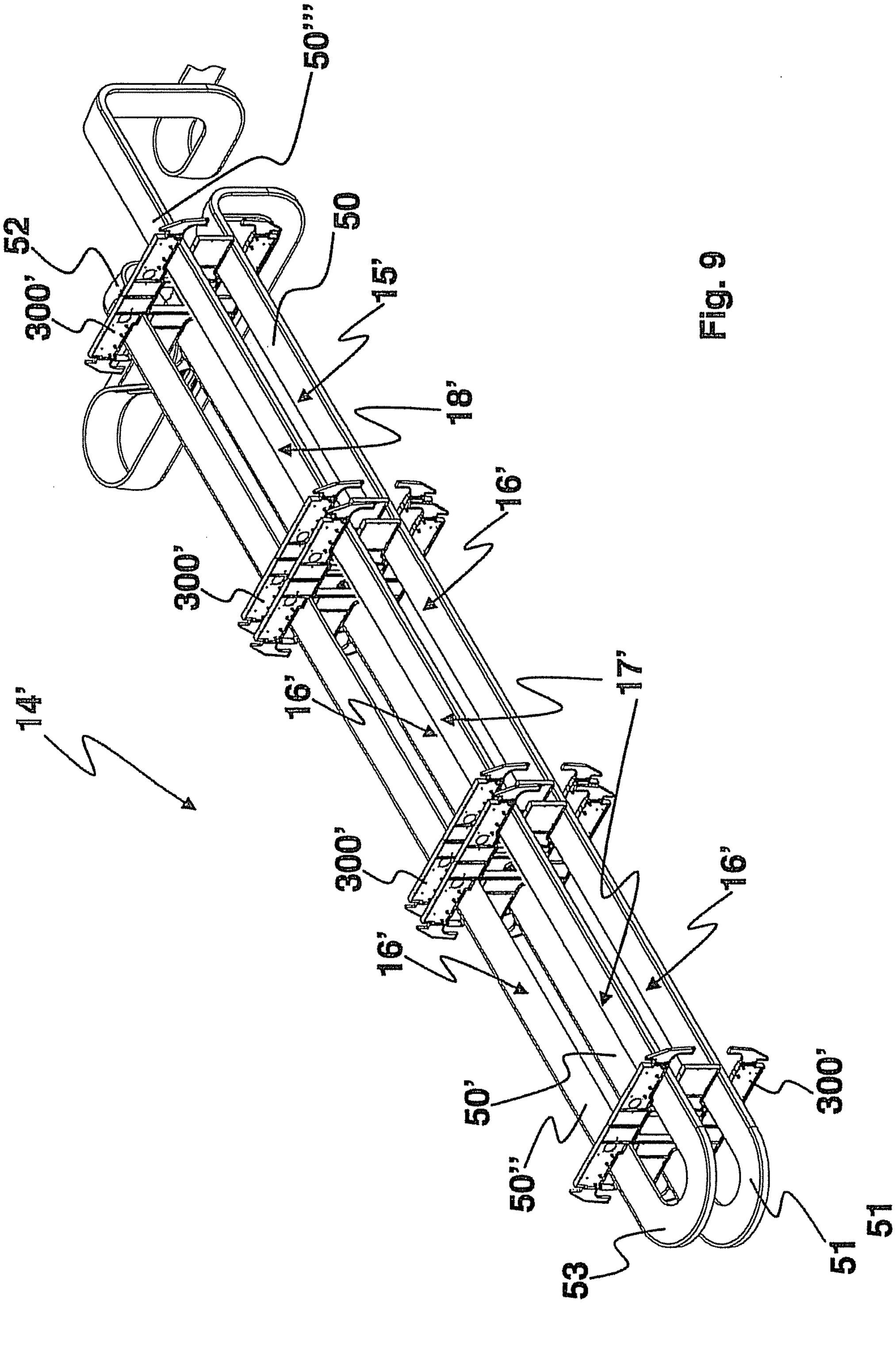
FIG. 9 is a schematic view of the course of the containers within the second oven of the system according to the invention.
Figure 10:
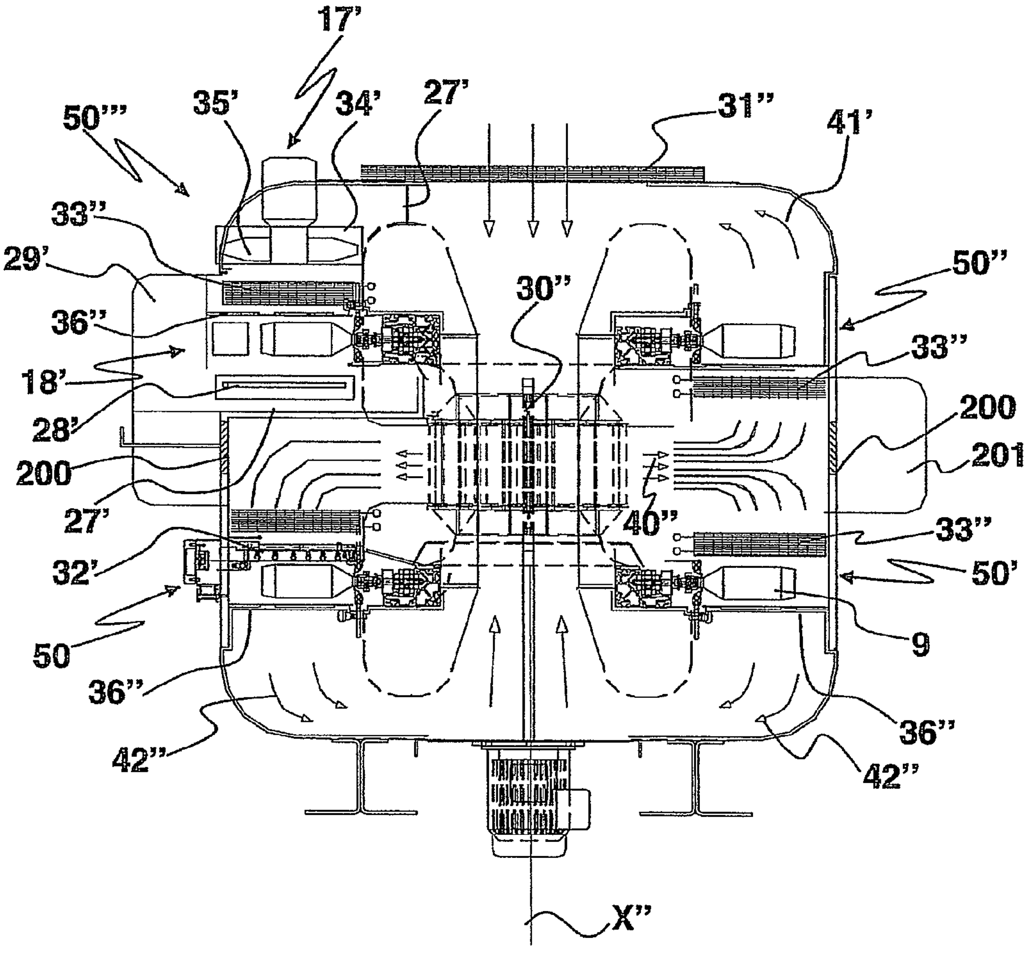
FIG. 10 is a cross section of said second oven in FIG. 9.

Before being immersed in top oven 14', the direction of motion of transfer chain 10 is further deviated first vertically upwards and then again horizontally so that the preform holders are turned and place the containers again in position with longitudinal horizontal axis. A third torsion of chain 10 is then induced. The containers then pass through top oven 14' in horizontal position remaining anchored to transfer chain 10 which follows a two-level course, schematically shown in FIG. 9, also comprising four banks, two lower and two higher, joined together by curved segments or simply by curves. With reference to FIG. 9 and to the cross-section shown in FIG. 10, and considering the sheet surface of the latter figure, containers 9 firstly pass through the lower left bank 50 thus moving away from the observer. Following curve 51, containers 9 then pass through the lower right bank 50' in direction of the observer. Following curve 52, the containers then go to the upper right bank 50" and advance away from the observer; finally, by means of curve 53 they go to the upper left bank 50'" advancing towards the observer and going towards the outlet of the top oven 14'.

In the preferred embodiment, the following are envisaged on lower left bank 50:

a first infrared radiation area 15' provided with IR modules, preferably but not necessarily five in number;

and a second hot air convention area 16', subdivided into modules preferably, but not necessarily, ten modules considering a total of fifteen modules on each bank.

The right lower bank 50' and the right upper bank 50" are provided with similar hot air modules.

The IR modules, delimited on the top and on the bottom by a perforated metallic sheet 36", for example aluminium, each comprise a battery of IR lamps 32', e.g. quartz lamps at a temperature of 1800° K of the low thermal inertia type, known as 'medium wave IR' lamps, or advantageously also lamps known as 'short wave' lamps with a temperature of 2400° K.

The following are envisaged within flowing-reticulation oven 14':

at least one air suction filter 31" arranged on the upper wall of oven 14', said air coming from the outside of the oven at a temperature from 15 to 35° C. and at a predetermined speed; and at least one fan with impeller 30", arranged essentially between the upper and lower banks of each thermal treatment tunnel which constitute the modular structure of the oven.

The air is aspirated through filter 31" longitudinally along axis X" of impeller 30" and then ejected by the same impeller at a 90° angle with respect to said axis. The side air flows 40" thus generated are split, by impacting on the side walls of the top oven, into a first upward flow 41" and second downward flows 42" through the IR modules and the hot air modules, the latter respectively of banks 50, 50' and 50". In this case, the air aspirated by filter 31" and ejected by impeller 30" will form on the left side (FIG. 9) only one downward flow 42" because the upper left bank 50" results in being isolated from the other banks by means of partition walls 27'. Before reaching containers 9, hot air flows 41", 42" and the cold air flow from channel 34" pass through the air-water finned packs or radiator 33" having the function of energy recovery of the radiative heat not absorbed by the container/coating system thus implementing a heat regulating action on the air of the oven itself. In this way, the air flow within top oven 14' is also advantageously optimised.

In both ovens 14, 14', and particularly in each of the thermal treatment tunnels forming the modular structure of the ovens, there are advantageously envisaged at least one outlet section, comprising for example one or more adjustable shutters 200, and at least one side discharge conduit 201 for the recovery of exhausted air. The exhausted air discharge system is advantageously envisaged in both ovens 14, 14"; in the case of the base oven 14, the exhausted air will be full of humidity, in the case of the top oven 14' it will be full of ethanol and/or other solvents.

The flowing step, the purpose of which is to remove the solvent, generally water, from the top paint is therefore based on the combined use of infrared radiation (IR) and hot air convection. The containers are subjected to infrared rays and to hot air for the time needed by the solvent to evaporate sufficiently and allow the concomitant homogenous flow of the top paint on the surface of the container. Also in this case, the completion of the subsequent process steps is thus improved, avoiding the formation of bubbles during the subsequent reticulation.

The top paint is finally reticulated in the upper left bank 50'", separated as previously mentioned from the other banks by means of partition walls 27'. The following are envisaged in this bank 50'":

a cold air conditioning area 17' where container 9 exiting hot air modules is cooled: the temperature of the container surface must be reduced from approximately 60° C. to a temperature lower than 40° C.; and an ultraviolet radiation area 18' in which the top paint polymerisation process occurs by means of a UV radiation of a certain wavelength.

Also in this case, the preferred embodiment envisages an area 17' comprising a cold air pressurised channel 34', provided with fans 35', and an area 18' comprising medium pressure mercury discharge lamps 28' and an ozone discharge channel 29'.

The top paint flow-reticulation steps are subdivided as follows:

flow: minimum time in the infrared radiation and hot air convention areas, net of the curves, equal to 30-50 seconds (preferably 40 seconds);

air conditioning area 17' for a maximum gross time of approximately 9 seconds (+/−3 sec);

UV reticulation in area 18' for a minimum gross time of approximately 5 seconds (+/−2 sec).

The thermal features of the flow-reticulation process are:

IR/hot air area: specific power of approximately 50-80 $kW/m^2$ (preferably 60 $kW/m^2$) of lamps 32'; ventilation of 2 m/sec on free area with air taken directly from the environment and calibratable temperature from 40° C. to 70° C.±2° C.;

cold air conditioning area 17': ventilation of 2 m/sec on free area with thermostat controlled air temperature equal to 20° C.;

UV area 18': specific power equal to approximately 120 $kW/m^2$ gross of lamps 28'; ventilation of 2 m/sec on free area with thermostat controlled temperature equal to a maximum of 20° C.

In the embodiment in FIG. 9, the top oven 14' envisages in all three thermal treatment tunnels; each of which may envisage on different banks, a hot air conditioning, a cold air conditioning, and the emission of ultraviolet radiation. Each tunnel is provided with at least one fan with an impeller and is delimited with respect to the adjacent tunnel by panels 300'.

At this point, at the outlet of top oven 14', the transfer chain 10 is subjected to a fourth and last torsion returning containers 9 fully dry and covered by two paint layers, to a vertical longitudinal axis position. Chain 10 finally reaches loading/unloading station 2 which takes the containers from the chain using appropriate gripping elements and shifts them to one or more downstream conveying lines of predetermined features, which take them to the subsequent processing stations, packing stations, etc. The type of conveying line may be, for example, an air conveyor or a slat conveyor.

Advantageously, in both ovens 14, 14', containers 9 advance, fixed to the preform holders, in horizontal position: this therefore prevents the containers from being soiled by particles or drops of lubricant or other particles of dirt dropped from the transfer chain 10. In this way, chain 10 may also be abundantly lubricated within the ovens themselves, where the need for lubricant is higher and the danger of soiling the containers with lubricant is therefore also increased, because the oven temperature renders the lubricant less viscous and more fluid.

Advantageously, one or more exhausted air recovery and conditioning stations may be envisaged for both ovens 14, 14', not shown in the figures, capable of processing high air flows. In these recovery and conditioning stations, there are envisaged systems, independent for the infrared radiation area and for the hot air area, to mix at least part of the exhausted hot air flow from the ovens with the air taken from the outside before it is conveyed back into the oven. Advantageously, in the system of the invention, it is possible to adjust air temperature within the ovens by operating on the feeding temperature of the water to the air/water heat exchangers. Other accessory stations may be envisaged for the coating process according to the invention, among which there are included a paint storage and preparation station and an exhausted air cleaning station for maintaining the emission levels compliant with the standards of the country where the system is installed. Such station may envisage a system for recovering solvents from the exhausted air or a system of burners for the partial recovery of the heating power of the solvent present in the exhausted air to be purified. The arrangement of IR modules, hot air modules, cold air modules and UV modules may be varied on the oven banks as also the times and other parameters of the various coating process phases according to the type of paints used, without departing from the scope of the invention.

The invention claimed is:

1. A coating system for applying at least two paint layers on plastic material containers, comprising:

a loading station for loading the containers onto a transfer chain system;

an unloading station for unloading the containers from said transfer chain system once the coating process of said containers is completed;

said transfer chain system being adapted to run along a closed course within said coating system so as to pass through;

at least one paint application station adapted to apply at least one paint layer on said containers; and first and second ovens adapted to treat a first paint layer and a second paint layer, respectively, so as to dry and polymerize the first paint layer and the second paint layer, applied to the containers in said at least one paint application station, each of said first and second ovens comprising:

one or more thermal treatment tunnels, each of the one or more tunnels formed by walls and having a longitudinal axis and a vertical axis, said longitudinal axis being longer than the vertical axis, wherein each of the one or more tunnels is subdivided into at least four sectors in cross section with respect to said longitudinal axis, at least two sectors of the at least four sectors being disposed above at least two other sectors of the at least four sectors, and the transfer chain system passes separately through each of the at least four sectors for conveying said containers through said at least four sectors in a sequence, at least one opening in a wall of each of the first and second ovens for entrance of a primary flow of air into the tunnels of the first and second ovens; and a forced ventilator arranged in a central area of each of the first and second ovens and adapted to produce secondary flows of air by dividing the primary flow of air into the secondary flows of air within the at least four sectors, wherein said first and second ovens comprise a first thermal radiation emission portion and a first air conditioning portion, and a second air conditioning portion and a second thermal radiation emission portion, where the first thermal radiation emission portion and the second thermal radiation emission portion are provided by a thermal radiation emitter arranged in a least one of said at least four sectors;

wherein, in the first oven, the first thermal radiation emission portion and the first air conditioning portion are adapted to dry the first paint layer, and the second air conditioning portion and the second thermal radiation emission portion are adapted to complete polymerisation of the first paint layer;

wherein, in the second oven, the first thermal radiation emission portion and the first air conditioning portion are adapted to dry the second paint layer, and the second air conditioning portion and the second thermal radiation emission portion are adapted to complete polymerisation of the second paint layer;

wherein the second oven is adapted to dry and polymerize the second paint layer applied onto the containers in the at least one paint application station used to apply the first paint layer, or in a different one of the at least one paint application station; and wherein for each of the first and second ovens there is at least one exhaust air discharge conduit.

2. A system according to claim 1, wherein the thermal radiation emitter of the first thermal radiation emission portion comprises infrared modules, said infrared modules being delimited by a perforated sheet, and comprising a battery of IR lamps.

3. A system according to claim 2, wherein the first air conditioning portion, subdivided into modules, comprises the forced ventilator adapted to produce the secondary flows of air and to deviate each of said secondary flows of air within each of said at least four sectors of said each of the one or more thermal treatment tunnels so as to uniformly pass through the infrared radiation module and/or modules of said first air conditioning portion.

4. A system according to claim 3, wherein the second air conditioning portion is present in one of said at least four sectors of said each of the one or more thermal treatment tunnels delimited from the other sectors by partition walls, and comprising a pressurised air channel, provided with fans adapted to cool the containers to a predetermined temperature.

5. A system according to claim 4, wherein the second thermal radiation emission portion is present in one of said at least four sectors of said each of the one or more thermal treatment tunnels, delimited by the other sectors by partition walls, and comprising ultraviolet radiation modules provided with discharge lamps and comprising an ozone discharge channel.

6. A system according to claim 4, wherein the transfer chain is adapted to move in the at least four sectors of said each of the one or more thermal treatment tunnels, each sector comprising a bank, each said bank being connected to a subsequent bank by a curved segment and adapted to position the containers with their longitudinal axes in essentially horizontal position within said ovens and in essentially vertical position outside said ovens.

7. A system according to claim 6, wherein in said each bank, a heat exchanger, separate from the thermal radiation emitter, is present for energy recovery of radiative heat not absorbed by the containers and for adjusting the air temperature within the ovens.

8. A system according to claim 6, wherein said each bank of said each sector of the at least four sectors, totals four banks; and wherein the first oven comprises a first part and a second part, the infrared radiation modules are arranged on the four banks in the first part of said first oven, the modules of the first air conditioning portion are arranged on three banks among the four banks in the second part of the first oven, the second air conditioning portion and the ultraviolet radiation modules are arranged on a bank among the four banks in said second part of the first oven, and wherein, in the second oven, the infrared radiation modules are arranged on part of a first bank, the modules of the first air conditioning portion are arranged on another part of said first bank, ,a second bank and a third bank, with the second air conditioning portion and the ultraviolet radiation modules arranged on a fourth bank.

9. A system according to claim 1, wherein said at least one paint application station comprises a rotary type machine, comprising:

a first immersion wheel for applying the first paint layer and a first spinning wheel for adjusting a thickness of the first paint layer;

a second immersion wheel for applying the second paint layer and a second spinning wheel for adjusting a thickness of the second paint layer;

a first and a second plurality of tanks respectively containing paint for the first paint layer and the second paint layer, arranged respectively under the first and second immersion wheel, about which said transfer chain is adapted to wind to change direction of motion, said tanks being adapted to turn in synchrony with the respective immersion wheel and simultaneously to vertically displace in order to accommodate at least one container so as to submerge it in the paint;

at least one delivery pump and at least one revolving joint and/or a communicating vessel system for feeding the paint to the tanks; and protective shields adapted to be positioned around the containers during spinning of said first and second spinning wheels, said shields being provided with a system for recovery of excess paint.

10. A system according to claim 1, wherein each of the first and second ovens comprises one or more exhaust air recovery and conditioning stations comprising a mixing system configured to mix at least some exhaust air from the at least one exhaust air discharge conduit of the first and second ovens with air taken from the external environment for subsequently conveying the mixed air in the first and second ovens.

11. A coating process for plastic materials containers by means of a coating system, said coating system comprising:

a loading station;

a unloading station;

a transfer chain system being adapted to run along a closed course within said coating system so as to pass through:

at least one paint application station, first and second ovens comprising:

one or more thermal treatment tunnels, each of the one or more tunnels formed by walls and having a longitudinal axis and a vertical axis, said longitudinal axis being longer than the vertical axis, wherein each of the one or more tunnels is subdivided into at least four sectors in cross section with respect to said longitudinal axis, at least two sectors of the at least four sectors being disposed above at least two other sectors of the at least four sectors, and the transfer chain system passes separately through each of the at least four sectors for conveying said containers through said at least four sectors in a sequence, and at least one opening in a wall of each of the first and second ovens for entrance of a primary flow of air into the tunnels of the first and second ovens; and a forced ventilator means arranged in a central area of each of the first and second ovens and adapted to produce secondary flows of air by dividing the primary flow of air into the secondary flows of air within the at least four sectors;

wherein said first and second ovens comprise a first thermal radiation emission portion and a first air conditioning portion, and a second air conditioning portion and a second thermal radiation emission portion where the first thermal radiation emission portion and the second thermal radiation emission portion are provided by a thermal radiation emitter arranged in at least one of said at least four sectors;

wherein, in the first oven, the first thermal radiation emission portion and the first air conditioning portion are adapted to dry a first paint layer, and the second air conditioning portion and the second thermal radiation emission portion are adapted to complete polymerisation of the first paint layer;

wherein, in the second oven, the first thermal radiation emission portion and the first air conditioning portion are adapted to dry a second paint layer, and the second air conditioning portion and the second thermal radiation emission portion are adapted to complete polymerisation of the second paint layer; and wherein for each of the first and second ovens there is at least one exhaust air discharge conduit;

the coating process comprising:

loading the containers into the loading station onto the transfer chain adapted to run on the closed course within said system, applying the first paint layer on the containers in said at least one paint application station, drying and polymerizing said first paint layer in the first oven, applying the second paint layer on the containers in the at least one paint application station used to apply the first paint layer, or in a different one of the at least one paint application station, drying and polymerizing said second paint layer in the second oven, and unloading the containers from said transfer chain.

12. A process according to claim 11, wherein the first air conditioning portion provides a suction of the primary flow of air, at a temperature from 15 to 35° C., by means of at least one suction filter present above the at least one opening in the wall of each of the first and second ovens, and forced ventilation of the containers by the forced ventilator means, generating the secondary flows of air in each of the first and second ovens, so that each of the secondary flows of air uniformly pass through infrared radiation modules in the first thermal radiation emission portion and/or modules in the first air conditioning portion which are present in said ovens.

13. A process according to claim 12, wherein in the first oven the container is present for approximately 10-20 seconds in the first thermal radiation emission portion, approximately 30-50 seconds in the first air conditioning portion, approximately 6-12 seconds in the second air conditioning portion and approximately 3-7 seconds in the second thermal radiation emission portion, and wherein in the second oven a container is present in the first thermal radiation emission portion and in the first air conditioning portion for approximately 30-50 seconds, approximately 6-12 seconds in the second air conditioning portion, and approximately 3-7 seconds in the second thermal emission portion.

14. A process according to claim 11, wherein there is provided:

an energy recovery of heat not absorbed by the containers and a heat regulation of the air within the ovens by means of heat exchangers, separate from the thermal radiation emitter, provided in each of the at least four sectors.

15. A process according to claim 11, wherein, in said at least one application station, the application of at least one paint layer on the container is performed by immersing the containers in a tank rotating in synchrony with the respective immersion wheel, about which the transfer chain is wound, and simultaneously displaced vertically to accommodate at least one container so as to immerse the container into paint, and wherein the immersion step provides a first immersion stroke of a tank to at least one container and a second immersion stroke wherein the average immersion and emersion speed is approximately 300 mm/sec and a time for which the container is maintained in immersed position is approximately 0.2 second.

* * * * *